March 7, 1950     C. L. PETERSON     2,499,412
FILTERING METHOD AND APPARATUS
Filed Oct. 4, 1943     6 Sheets-Sheet 1
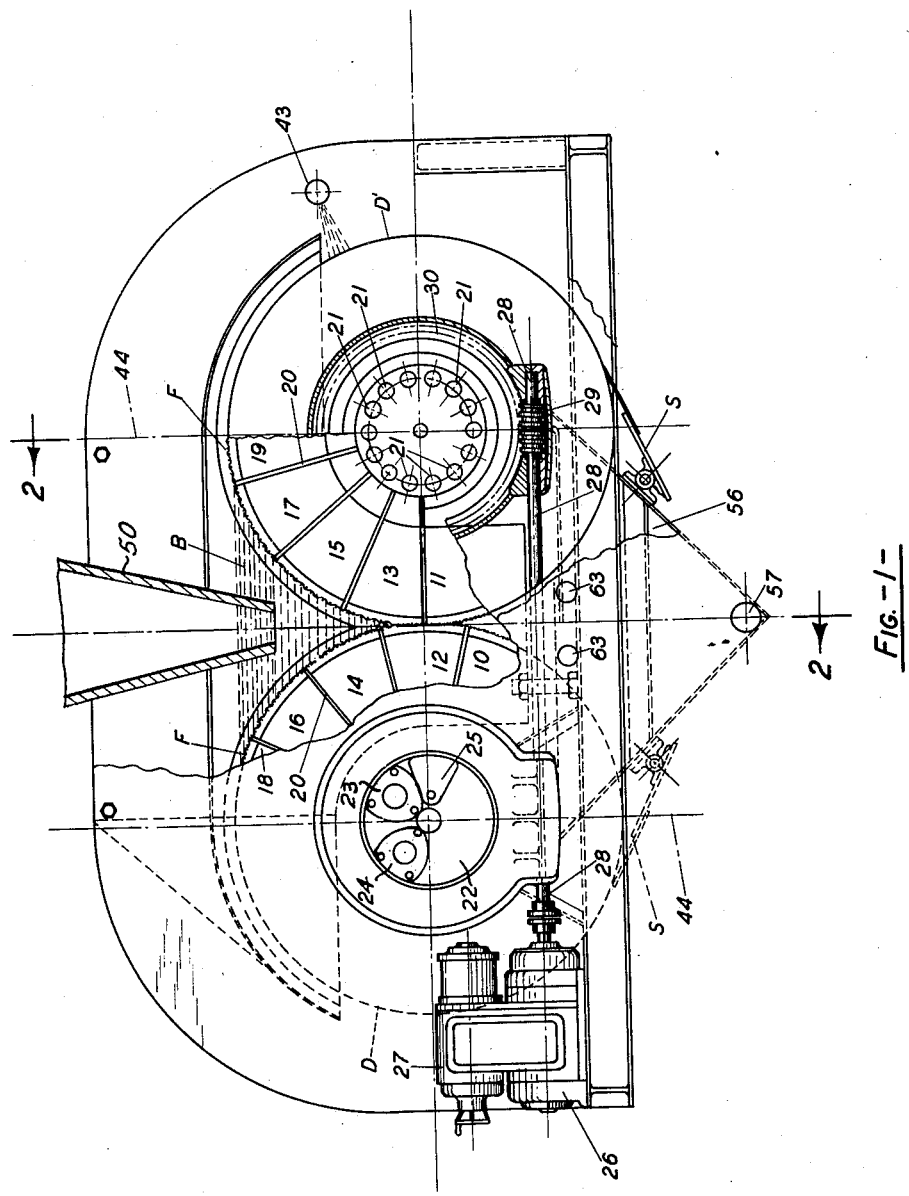
C. LYNN PETERSON
INVENTOR.
BY *H. A. McGrew*
ATTORNEY.

March 7, 1950 C. L. PETERSON 2,499,412
FILTERING METHOD AND APPARATUS
Filed Oct. 4, 1943 6 Sheets-Sheet 2
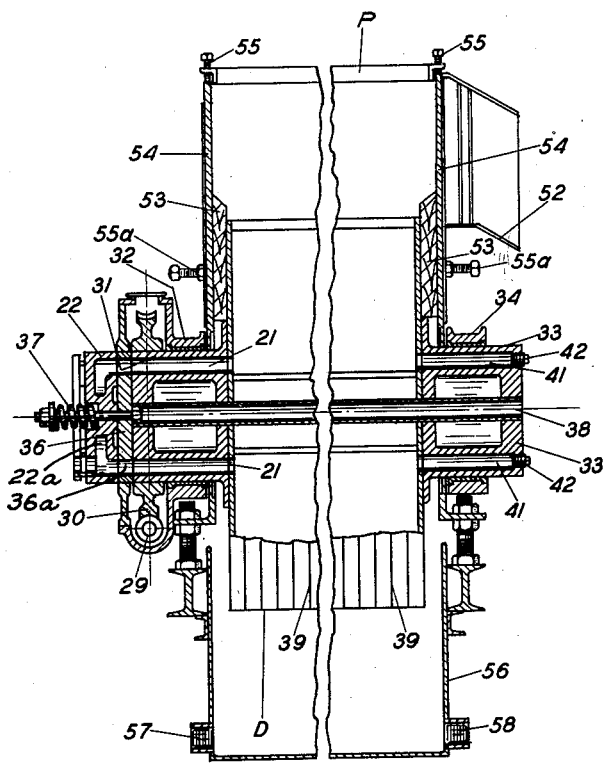
FIG.-2-
C. LYNN PETERSON
INVENTOR.
BY
ATTORNEY.

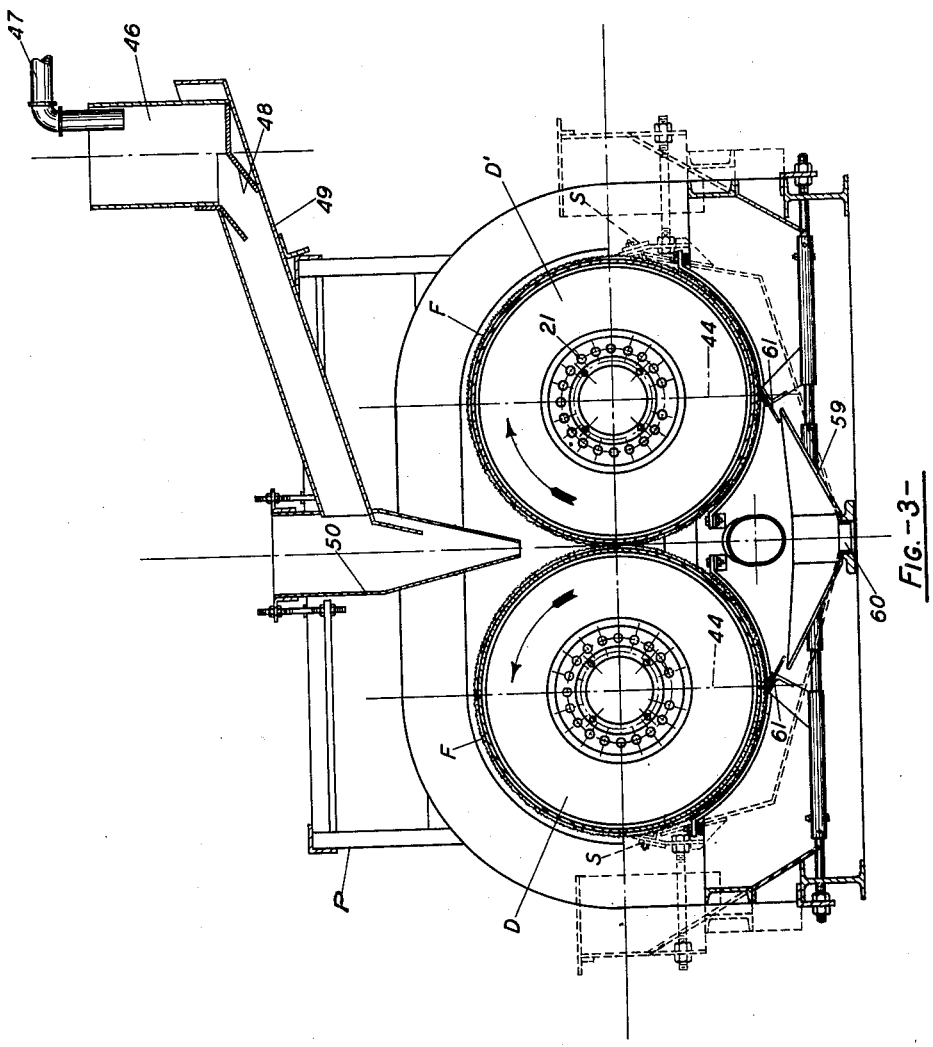

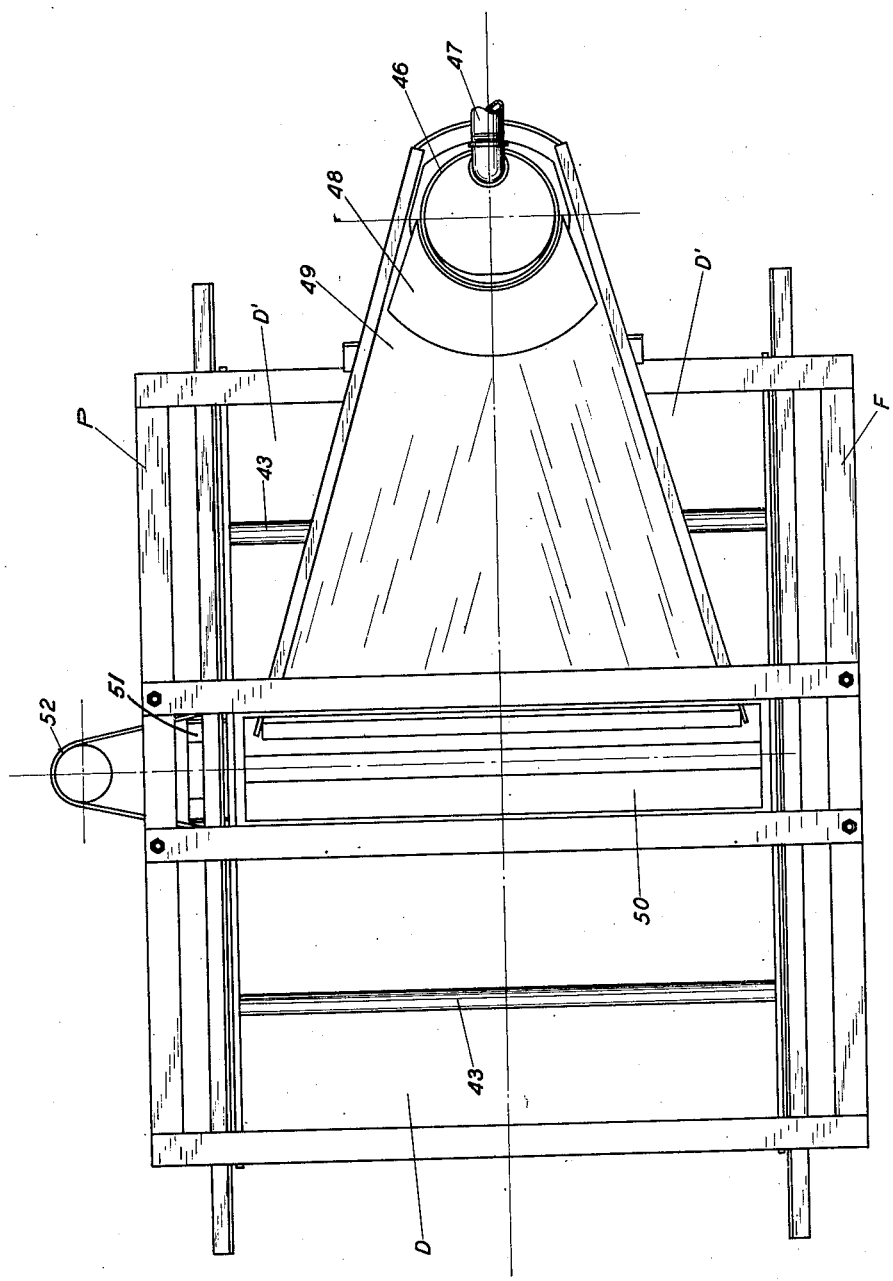

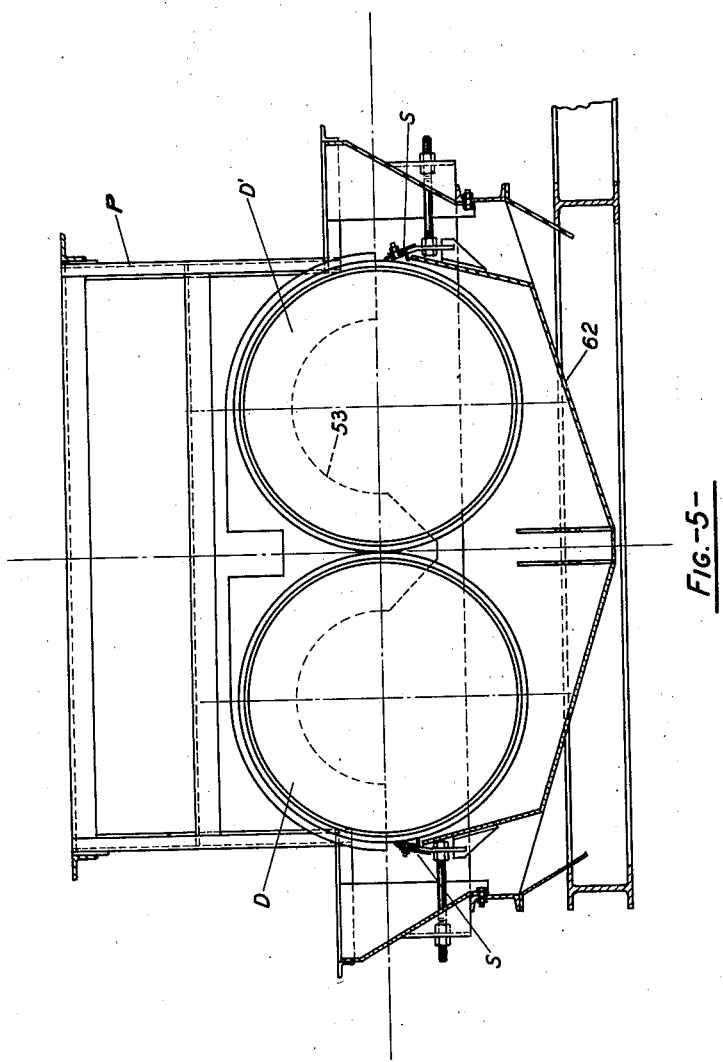

March 7, 1950  C. L. PETERSON  2,499,412
FILTERING METHOD AND APPARATUS
Filed Oct. 4, 1943  6 Sheets-Sheet 6
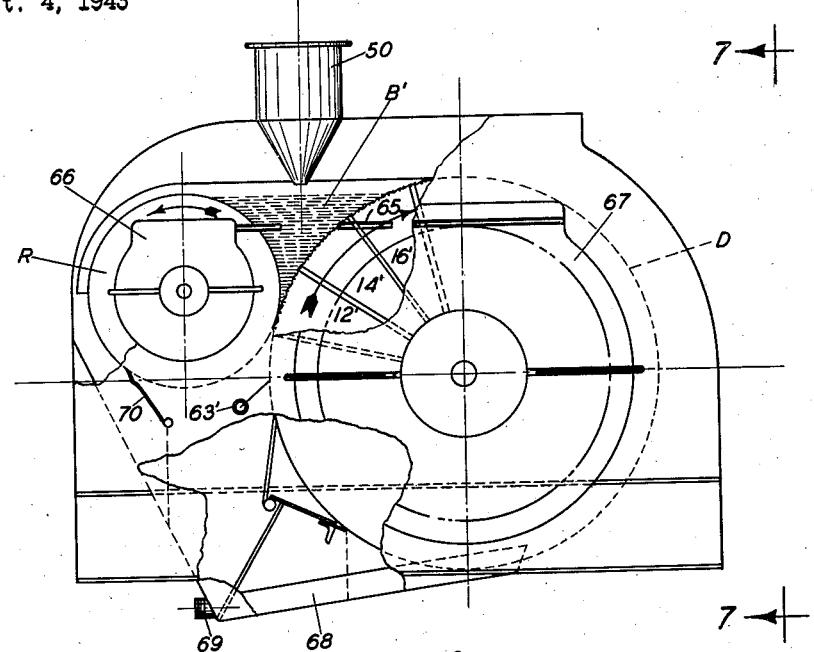
FIG.-6-
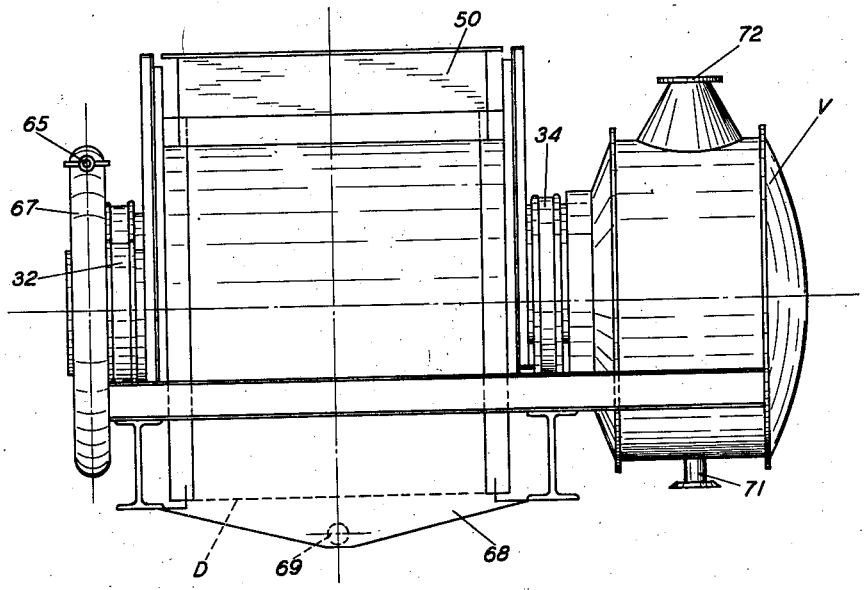
FIG.-7-
C. LYNN PETERSON
INVENTOR.
BY *H. A. McGrew*
ATTORNEY.

Patented Mar. 7, 1950

2,499,412

UNITED STATES PATENT OFFICE 2,499,412

FILTERING METHOD AND APPARATUS

C. Lynn Peterson, Salt Lake City, Utah, assignor to Peterson Filters and Engineering Co., Salt Lake City, Utah, a partnership Application October 4, 1943, Serial No. 504,831

4 Claims. (Cl. 210—199)

This invention relates to filtering, and more particularly to a method of and apparatus for removing solids or cake and filtrate from fluent matter, such as a mixture of solids or suspended matter and liquids, by the controlled subjection of fluent matter resting on or against a filtering medium, to vacuum, pressure, and other influences. This invention more specifically relates to a continuous filtering method and apparatus, in which the fluent matter is placed in the space between and above a pair of cylindrical drums, the exterior of at least one of which is covered with a filtering medium, and which are placed in tangential relationship and rotated in opposite directions.

The common type of continuous filtering apparatus comprises a single drum rotating in a tank or vessel containing fluent matter, the fluent matter contacting more or less of the greater part of the lower periphery of the drum. The drum is divided into longitudinal sections, and is provided with vacuum connections to draw filtrate or wash solution through the filtering medium, or introducing air or other suitable medium under pressure to blow off the deposited solids or cake. Normally, a vacuum is pulled on each drum section during its passage through the fluent matter and for a period thereafter, to remove filtrate. When each section reaches a predetermined position, such as the top of the drum, a cleansing fluid, such as water, is sprayed onto the deposited cake, and this is pulled through the filtering medium, to remove as much filtrate as possible with it. The filtrate and wash solution are collected in suitable receptacles, and if the wash solution is collected in a separate receptacle, a separate vacuum connection is required. Usually on the rear portion of the drum, a scraper or other suitable means is provided for removing as much cake as possible from the surface of the filtering medium, and usually prior thereto and during scraping, air under pressure is introduced to the section to loosen the deposited cake.

However, such single drum filters have disadvantages. For instance, the cake tends to fall off during upward passage of the section, and fall back into the body of fluent matter, thereby changing the concentration of solids in the fluent matter and varying the operating conditions over a short period of time. Thus, when the amount of vacuum is satisfactory for optimum operation with a certain percentage of solids in the fluent matter, falling cake can readily change such concentration, thus varying the conditions and rendering the apparatus further inefficient. Again, unless considerable precaution is taken, some of the cake dislodged on the ascending side of the drum falls back into the body of fluent matter, again changing the concentration of solids.

Such single drum filters are inefficient in filtering mixtures in which the solids are not only fast settling but consist of particles which have a wide range of sizes, say for example, plus 14 mesh to minus 350 mesh. In the single drum type of filter, the fines or slimes do not follow the fast settling particles, making a layer or zone through which the filter medium must pass before engaging the coarse or fast settling particles. Thus, the filter medium is coated with the slimes, making an effective cake formation of the coarse particles very difficult, if not impossible. The filter medium is soon blinded by the slimes, even though a single drum may be provided with a more porous filter medium and greater displacement so as to filter the mixture, the solids of which have less range in differential particle size. Furthermore, single drum filters operate without the benefit of the force of gravity in relation to the suspended particles. The cake consisting of these particles is formed through the kinetic forces developed when the liquid or filtrate is pulled toward the filter medium. If these kinetic forces are not sufficient to overcome the force of gravity, no cake formation results. Also, the aforementioned sliming of the filter medium retards the velocity at which the filtrate is pulled through the medium, thereby further minimizing the kinetic forces, which are dependent upon the velocity.

Attempts have been made to overcome some of the above defects, as in U. S. Patent No. 1,449,774, by providing a receptacle for fluent matter at the top of a drum, as by a pair of rolls, or in the space above and between a pair of tangentially related drums, so that the force of gravity will assist in the deposition of solids and the deposited cake will fall off more or less naturally from the bottom of the drums. However, as far as is known, such attempts have not been successful, possibly because of inadequate seals for the sides of the drums and inadequate sealing effect between the drums. Also there appears to have been little realization of an adequate solution of the actual problems involved, including the critical factors of relationship between drum speeds and point of maximum pickup, and as evidenced by the materials of which the drums are constructed, the absence of adequate scraper units, the lack of provision for minimization of contamination of the discharged cake by seal leakage, and the lack of means for handling the excess feed of mixture of fluent matter to maintain uniform submergence of the filtering medium, or means for evenly distributing the fluent matter to the space above and between the drums.

Among the objects of this invention are to provide a more efficient filtering method; to provide such a method which is practical and operable industrially; to provide such a method which may be carried out by one or more filtering surfaces, in which the cake is deposited from above onto the filtering surface rather than from beneath, as in previous general practice; to provide such a method in which the filtrate is drawn from above through the filtering surfaces; to provide such a method in which contamination of the cake by leakage of fluent matter or feed mixture is minimized; to provide such a method in which excess feed of mixture is controlled, to prevent contamination of the discharged cake; to provide such a method, involving a pair of filtering surfaces which are tangentially related along a substantially horizontal line, in which the fluent matter is fed into the space above and between the filtering surfaces; to provide such a method in which an adequate seal between the surfaces is maintained, and also in which an adequate seal at the ends of the surfaces is maintained; to provide such a method in which the solids are deposited upon the filtering surface or surfaces in a more effective and efficient manner; to provide such a method in which the cake is removed from the filtering surfaces at such points as to minimize the possibility of contamination by leakage; to provide apparatus suitable for carrying out the above method; to provide apparatus including a pair of filtering drums in which wear of the filtering surfaces is minimized; to provide such apparatus in which the distribution of fluent matter to the space between and above a pair of tangentially related drums is more even and therefore more effective filtration is produced; to provide such apparatus in which excess feed of fluent matter is adequately handled; to provide such apparatus in which the ends of a pair of drums are more effectively sealed; to provide such apparatus in which the possible deleterious effects of leakage are overcome; to provide such apparatus in which adequate seals are maintained at points of possible leakage; to provide such apparatus in which expansion and contraction effects are substantially avoided; to provide such apparatus in which an even feed of fluent matter is obtained; and to provide such apparatus which is operable under a variety of conditions, particularly with respect to fluent matter having solids of rather widely varying particle size. Other objects and novel features of this invention will become apparent from the following description.

A filtering method carried out in accordance with this invention comprises the steps of moving a pair of substantially endless filtering medium surfaces along predetermined paths, the paths being in relatively close juxtaposition along a substantially horizontal line and the surfaces diverging from each other both above and below such line. Fluent matter is introduced into the space between the surfaces above the line, and vacuum and pressure influences are produced to cause deposition of solids upon the surfaces and also to cause filtrate to be drawn through the filtering mediums, as through the production of a sufficiently low absolute pressure on said filtering medium opposite the body of fluent matter. Pressure influences, or sufficiently high absolute pressure, are produced in the region of such horizontal line to cause the filtering surfaces to be pressed against each other and thereby provide a more effective seal, while vacuum influences are produced at points above the horizontal line, beginning at points sufficiently removed from the horizontal line so that the cake, once deposited, is not disturbed by gravity or flow of the fluent matter. Preferably, the amount of vacuum, the rate of feed of fluent matter, and the point of initial pickup are so correlated that relatively large quantities of solids are deposited by the natural flow of fluent matter over the filtering surfaces and gravitational deposition.

In pressing the filtering surfaces against each other adjacent the horizontal line of relatively close juxtaposition, the pressure influences are preferably applied to horizontal portions or sections of the filtering surfaces, with the sections of the two surfaces in staggered relation, so that when pressure is applied to the section of one surface, the central portion of such section will press against the line of division between two sections on the opposite surface. As the surfaces move past the horizontal line, alternate sections of the surfaces will be pressed toward the opposite surface, with the result that the sections under pressure—which are thereby caused to extend slightly—are interlaced or interweaved as it were, to provide a more effective seal. In addition, the filtering surfaces may be restrained along spaced substantially parallel lines running in the direction of movement of the surfaces, with the lines of one surface being disposed in staggered relation to the lines of the opposite surface, so that again, at the horizontal line, there will be slightly extended pressure sections, portions of which press against the lines of restraint on the other surface, and vice versa. In maintaining the body of fluent matter in the space above and between the surfaces, as when the filtering medium is mounted upon a pair of rotating drums, an effective seal is produced at the ends of the drums by cheek plates or the like which extend from the highest portions of the drums to a point below the horizontal line of substantial tangency. To produce the most effective seal, a uniform pressure is exerted upon each of the cheek plates. Since an absolutely tight seal is often difficult, if not impossible, to attain, leakage from the seals—which tends to run down the underside of the drums or surfaces—is caught beneath the drums and returned to the body of fluent matter in the space above and between the surfaces. Also, further to avoid contamination of the cake or deposited solids, such cake is removed from the drums at a point beyond the lowest point of the drums, on the side opposite the line of substantial tangency.

Further to assure an even supply of fluent matter and to maintain the same hydraulic pressure upon the surfaces during relatively long periods of operation, the body of fluent matter is maintained at a predetermined level by discharge or overflow therefrom whenever the body tends to rise above a predetermined level.

By the foregoing method, substantially uniform filtering results may be obtained with a maximum of efficiency and a minimum of losses, particularly during relatively long periods of operation. To carry out such a method, apparatus constructed in accordance with this invention is preferably utilized.

Such apparatus may comprise a pair of rotating drums provided with filter mediums, which drums have substantially identical diameters and are driven at the same rate of speed in opposite directions. The axes of the drums are preferably maintained in substantially exact parallelism, and spaced so that the drums are substantially tangent, i. e. in relatively close juxtaposition along a horizontal line which preferably lies in the same plane as the parallel axes of the drums. The circumference of each drum is preferably divided into sections, which extend longitudinally, and the drums are disposed with the sections of one drum in staggered relation with respect to the sections of the other drum, so that at the point of substantial tangency the center line of the section on one drum will be opposite the division line between two sections on the opposite drum. The drums are preferably provided with suitable connections for producing a vacuum or sufficiently low absolute pressure in one or more sections at predetermined points in rotation of the drums, and also producing a pressure influence, as by blowing air or the like into one or more sections, at other predetermined points during rotation. When the filtering medium is cloth, for example, it may be held securely to the drums by circumferentially extending bands or straps spaced apart at suitable distances, but the straps on one drum are preferably staggered or interposed between the straps on the opposite drum, so that when pressure is applied as each section approaches and passes through the horizontal line of substantial tangency, not only will the center of a longitudinal section expand against the division line between two sections on the opposite drum, but also the central portion of a section produced by the circumferential bands or straps will expand against a band or strap on the opposite drum. A more effective seal at and adjacent the horizontal line of substantial tangency is thereby produced, since the central or furthest extending portion of each section will press against a division line between sections or a band or strap. The pressure exerted upon the sections at and adjacent the horizontal line of substantial tangency may discontinue before the point at which a vacuum is produced, to draw filtrate through the filtering medium, and cause deposition of cake upon the filtering medium surfaces. Preferably, such vacuum is produced at a point at which the deposited cake will no longer be disturbed by gravity or wave motion effects of the fluent matter.

To provide an even supply of fluent matter, of which the solid or other filterable component is evenly distributed across the entire width of the filtering surface, the fluent matter is fed into the space above and between the drums by means which includes a diverging apron which fans out or spreads the feed mixture and thus insures that the density of the fluent matter along the length of the drums will be substantially uniform.

To prevent damage to the filtering medium due to a rubbing or scrubbing action because of difference in peripheral speeds, it is necessary that the drums initially have substantially identical diameters within rather close tolerances, that the drums be driven at substantially identical speeds, and that changes in drum diameter due to expansion or contraction be kept to a minimum. So that the drums will maintain their substantially identical diameter, and particularly so that wetting and/or drying will have no effect upon the diameter of the drums, the framework or supporting structure of the drums is made of metal or the like substantially throughout, as distinguished from the previous practice of utilizing wood or the like for such drum constructions.

As the drums rotate outwardly from the body of fluent matter, the vacuum influences are maintained and, at the same time, wash solution, such as water, is sprayed onto the cake of deposited solids, to remove as much mother liquid or filtrate as possible before the cake is discharged from the drum. The wash solution is drawn into the interior of the drum, as was the filtrate during cake deposition, and the wash solution may be conveyed to the filtrate or to a separate place for treatment, if so desired. After washing, the cake is preferably subjected to a pressure influence, as by introducing air under pressure into each section of the drum as it reaches a predetermined point in rotation, normally on the back or descending side of the drum, opposite the horizontal line of substantial tangency between the drums. Such pressure tends to loosen the cake and cause it to drop off or be more readily deflected off by suitable scraping means, which may be provided at one or more points on or adjacent the underside of the drum, but beyond the vertical center line of the drum on the side opposite the line of substantial tangency. Removal, scraping or deflecting of the cake at such point or points prevents contamination by filtrate which has leaked around the end seals or between the drums and flows down along the underside of each drum. A suitable pan or pans are provided to receive such leakage of fluent matter, which may be returned to the body of fluent matter or supply therefor.

The foregoing features, as well as other features and the cooperation and correlation between the various parts of the apparatus, will be more evident from a detailed description which follows, taken in connection with the accompanying drawings, in which:

Fig. 1 is an end elevation, partly in section, of a double drum filtering apparatus constructed in accordance with this invention;

Fig. 2 is a vertical section taken along line 2—2 of Fig. 1, longitudinally of a drum;

Fig. 3 is a vertical cross section taken through the central portion of the apparatus, perpendicular to the axes of rotation of the drums, showing modified forms of drip pan and feed device;

Fig. 4 is a top plan view of a feed device forming a portion of the apparatus;

Fig. 5 is a partially phantom end view, illustrating an alternative scraper and drip pan arrangement;

Fig. 6 is an end elevation, partly in section, of an embodiment of this invention, which includes a single filtering drum and a cooperating idler or roller drum; and Fig. 7 is a side elevation of the apparatus of Fig. 6.

As illustrated in Figs. 1 to 4, inclusive, apparatus constructed in accordance with this invention may comprise a pair of drums D and D' disposed in substantially tangent relationship with the axes of the drums horizontal and parallel to each other. The cylindrical peripheral surface of each drum is covered with a filtering medium F, such as a suitable filtering cloth, and each drum is divided into sections, such as sections 10, 12, 14, 16 and 18 of drum D and sections 11, 13, 15, 17 and 19 of drum D', by partitions 20, disposed alternately as shown. The filtering medium may extend entirely around the periphery of each drum, or each section, 10, 11, 12, etc., may be provided with its own filtering medium, so that individual sections may be replaced when necessary.

Each section is connected with a port 21, as in the case of drum D', so that the desired vacuum and/or pressure influences may be exerted upon the filtering medium, through the sections. Ports 21 are successively connected, through a valve 22, with a connection 23 for low vacuum, a connection 24 for high vacuum, and a connection 25 for the introduction of air and/or steam under pressure. The vacuum connections 23 and 24 and air and/or steam connection 25 may be similar to those normally employed on single drum vacuum filters, and pipes or lines leading therefrom are connected with suitable evacuating pumps and sources of air and/or steam of a standard nature.

Disposed in the space above and between the drums is a body B of fluent matter to be filtered, and the foregoing pressure and vacuum influences are adapted to cause, or assist in causing, the deposition of cake upon the surface of filtering medium or cloth F and the withdrawal of filtrate through the sections, by means of vacuum.

The drums are rotated by a motor 26 provided with variable speed drive 27, and connected with a shaft 28 upon which are mounted a pair of identical worms, such as worm 29. Each worm drives a gear 30 attached to a hollow shaft 31, containing ports 21 and rotatable in a bearing 32 at one end of each drum, as in Fig. 2. A similar hollow shaft 33 is rotatable in a bearing 34 on the opposite side of each drum, the drum being secured to the shafts in any suitable manner, such as by bolting through flanges on the shaft.

As in Fig. 2, valve 22 is provided with spaces 22a in the interior thereof which communicate with the low vacuum, high vacuum and air connections, and a fixed wear plate 36 is interposed between valve 22 and the end of hollow shaft 31, the plate 36 being provided with holes 36a therethrough, as in Fig. 2, corresponding in size and location to the ports 21. As the drum rotates, when one of the ports 21 begins to register with a hole 36a in plate 36 which communicates with a space in valve 22 through which high vacuum, for instance, is introduced, a vacuum effect is provided in the section corresponding to the port; and as the drum rotates further, the full vacuum effect is attained. Filtrate or wash water, as the case may be, is drawn through the section, thence through the port 21, and is conveyed to a suitable tank or collecting receptacle, through the vacuum connection 23 or 24. The valve 22 is held in position, and a seal obtained between valve 22, plate 36 and the end of hollow shaft 31, by a spring 37 attached to the end of a rod 38 extending centrally of each drum.

The filtering medium F is preferably secured to the periphery of the drum along a horizontal line corresponding to the division line between two of the sections, at the end of partitions 20, by a band, strap or the like. In addition, a plurality of bands or straps 39 extend circumferentially of each drum, as in Fig. 2, to securely fasten the filtering cloth to the drum. The bands or straps 39 of one drum are disposed in staggered relation with respect to the bands or straps of the opposite drums, as explained previously. The filtering cloth may be supported by a suitable grid or the like, having a plurality of openings, and fastened in position at the ends of the drum sections by attachment to partitions 20 in a suitable manner, as by locking keys or studs.

To permit ports 21 to be cleaned, the hollow shaft 33 may be provided with clean-out holes 41, the ends of which are normally closed by plugs 42.

In the position shown in Fig. 1, the section 12 of drum D is subjected to air pressure, to cause the central portion of the filtering medium to expand against the partition 20 opposite thereto, while section 11 of drum D' is beginning to be subjected to air pressure and section 13 is being relieved of air pressure. As will be evident, the pressure is, in effect, supplied alternately to the sections of the respective drums, since a specific section of one drum, such as section 12, will be subjected to pressure later than one opposed section of the other drum, such as section 13, but earlier than the other opposed section of the other drum, such as section 11.

In addition to assisting in effecting a seal along the horizontal line of substantial tangency, the air pressure introduced into section 12, for instance, also causes air to bubble out into the body of fluent matter, which provides a relatively uniform agitation and minimizes settling, thus assisting in maintaining the freedom of the particles of solid matter in the body of fluent matter, which is essential to uniform cake formation.

Section 14 of drum D is subjected neither to pressure nor to vacuum, thus providing what may be termed a "dead zone" between the sealing section adjacent the horizontal line of substantial tangency, and sections 16 and 18 which are subjected to low vacuum influences which, however, are sufficient to cause relatively rapid deposition of the solids or cake upon the filtering medium or cloth, and to draw the filtrate through the filtering medium into the interior of the drum. It has been found that if attempt is made to deposit the cake upon the filtering medium covering section 14, for instance, the cake tends to fall off or be removed, either by gravity or by the motion of the body of fluent matter, due to incoming fluent matter or circulation during filtering. If a portion of such deposited cake falls off the drum surface, then the concentration of the fluent matter is changed, because the filtrate which was initially associated with the solids just falling off, has already been drawn into the drum. Such a change in concentration, while very slight for any specific portion of the cake that falls off, is cumulative, and may cause the concentration and therefore the operating conditions to vary rather widely over any long period.

The section 15 of drum D' is passing out of the "dead zone" into the low vacuum zone while the sections 17 and 19 are subjected to low vacuum influences.

As the drums rotate around, the deposited cake is sprayed by a suitable washing solution, such as from spray pipes 43, and at or about the same time the cake is subjected to relatively high vacuum influences. The wash solution, in flowing through the cake, permits recovery of more filtrate by displacement. Other solutions than water may be utilized for washing, particularly where the cake contains some material which is to be dissolved by the wash solution. For example, the cake may contain small amounts of grease or the like, and a suitable solvent therefor may be utilized as the washing solution. It will be understood, of course, that the washing solution may have any desired temperature, cold, hot, or intermediary.

As the drum rotates further, the vacuum influences are removed from each section and the cake is in position to be removed from the filtering medium, as by scraping means S.

In accordance with this invention, the scraping means is located at a point beyond or behind the vertical center line 44 of each drum, i. e. on the lower periphery of the drum, but on the side opposite the point of substantial tangency with the other drum. This is a relatively important feature, since some leakage of fluent matter past the end seals cannot be avoided, in normal operation, and such leakage tends to run down the inside of the drums. As will be described in greater detail hereinafter, in further accordance with this invention, suitable means are provided for catching such leakage and returning it to the body of fluent matter.

In the position shown in Fig. 1, the peripheries of sections 16 and 18 of drum D and 17 and 19 of drum D', as will be observed, are more nearly horizontal than the peripheries of sections 12, 13, 14 and 15, for instance. By beginning the vacuum influence at a point, such as at the lower edge of section 16, it is possible to form a more uniform cake at a greater rate and at a greater peripheral drum speed. This is possibly due in part to the aforesaid tendency for portions of the cake to drop off when deposited on a more nearly vertical peripheral section. However, the exact reason for the better results is not known, but it is believed that there is an angle of repose, as it were, which is relatively critical and above which better results are produced. For instance, in the case of a drum having a diameter of two feet, better results are produced if the vacuum influences are not begun until a point or line is reached on the periphery of the drum which makes an angle of 45° with the horizontal axis of the drum. Again, the point at which the vacuum influences are begun is probably also related to the distance through which the cake must be lifted from such point to the top of the drum. A further possible or partial explanation is that the deposition of cake along the more nearly horizontal peripheral drum sections is due partly to gravity and also wave or flow effects of the fluent matter in moving to the edges of the body thereof. In any event, it is possible to increase radically the amount of filtrate drawn through the filtering medium per unit of solids deposited. This, of course, permits increases in drum speed and/or treatment of greater amounts of fluent matter at the same drum speed, and at lower vacuums.

In still further accordance with this invention, the peripheral speeds of the drums, i. e. the rate of travel of the filtering surfaces, is maintained substantially constantly identical. This has been found to be essential to obtain cloth wear for any considerable period of time. By substantially constantly identical speeds is meant speeds as closely identical as operation and construction can maintain. Since the drums are preferably driven from a common shaft, and commercially manufactured worms and gears can be held to very close tolerances, little difficulty normally will be encountered from variations in the rotational speeds at which the drums are driven. However, greater difficulty may be encountered in variations in drum diameter and possible expansion and contraction effects. For instance, a $\frac{1}{32}$" difference in drum diameters will result in a difference in travel of the surfaces of approximately 6 feet during a twenty-four hour period, with drums nominally 3 feet in diameter and having a rotational speed of 2 R. P. M. The scuffing action between the cloths, due to such difference in travel, causes the cloths to wear out very quickly. The down time due to cloth replacement, as well as the actual cost of labor and materials, adversely affects economical operation. By limiting the variation between drum diameters to relatively close tolerances, such as a permissible variation of 0.007" for drums 36 inches in diameter, difficulties due to cloth wear can be minimized or substantially eliminated.

Further difficulties caused by variations in peripheral travel may be due to expansion and contraction of one or the other drums due to wetting and drying. Many drums have been heretofore constructed of wood, but such material cannot be used in the apparatus of this invention. It is necessary, therefore, to utilize metals or plastics of the thermal setting variety, or other materials such as glass or the like, which are not affected by wetting and drying.

In order that the operating conditions will be substantially uniform along each drum and at different periods of time, it is desirable to distribute the fluent matter substantially uniformly to the body, and to maintain a constant depth thereof. To this end, a feeding and overflow device, such as illustrated in Figs. 3 and 4, may be utilized. The feed device may comprise a well 46 into which the fluent matter is discharged from a pipe 47 and a lower side of which is provided with a spreading plate 48 over which the fluent matter flows onto a diverging, downwardly inclined apron 49, the slope of which is adjustable. The divergency of this apron is such that the fluent matter flowing thereover spreads out to each side until it forms a stream of substantially the same width as the length of the drums. This causes the distribution of solids to be substantially uniform along the length of the drums. If desired, the fluent matter may be discharged directly from the apron into the space above and between the drums, but to produce a more equalized flow and pressure the fluent matter from the apron may discharge into a downwardly tapering well 50, which is, of course, substantially the same length as the drums, as is evident from Fig. 4. The vertical position of the well is adjustable, and the lower end of the well is spaced within or above the level of fluent matter, in accordance with the motion of fluent matter desired, as the incoming fluent matter tends to pass down the center and then up and along the drums. The circulation desired, and the velocity thereof will depend upon the composition of the fluent matter, the tendency for the cake to be washed away or be deposited in greater amount due to wave motion, and other factors which may vary, as with different types and/or concentrations of fluent matter. The position shown in Fig. 3—i. e. with the lower end of well 50 terminating within the body of fluent matter at a point about midway between the line of substantial tangency and the tops of the drums—has been found satisfactory in a number of instances.

The feed device may be supported on a framework P, which also forms a support for spray pipes 43. If conditions require the same, a water overflow device, similar to a trough or weir box, may be substituted for the spray pipes, to produce a more gentle flow of washing solution onto the cake, although in most operations the impact of solution discharged from the spray pipes will not produce an unreasonably disturbed influence upon the cake.

An overflow weir 51 leading to a chute 52, as in Figs. 2-4, may be supported on the framework, the edge of the weir being at a predetermined height. The overflow weir is preferably adjustable in height, so that the depth of the body of fluent matter may be regulated as desired. Fluent matter discharged from the overflow chute may be collected in any suitable manner and returned to the line leading to pipe 47.

To maintain an adequate seal at the ends of the drums, it is desirable to utilize means such as cheek plates 53, as in Figs. 2 and 5, which are pressed against the ends of the drums. The cheek plates may comprise blocks attached to metal supporting plates 54, and may be supported independently of the drums so as to be adjustable in height, as by studs 55. For adequate sealing, it is necessary that the cheek plates extend not only across the space between the tops of the drums, but also around the periphery of each drum to a point below the horizontal line of substantial tangency.

In addition, it is desirable that the cheek plates be pressed against the drums by substantially uniform pressure, as produced by screws 55a. The cheek plates are preferably made of material which is resistant to wear and which provides a water lubricated bearing surface, to minimize frictional resistance. One material which has been found to be satisfactory is the plastic known as "Micarta," but other materials will suggest themselves to those skilled in the art. In case the liquid portion of the fluent matter is other than water, the cheek plates should be formed of such material that the joint between the cheek plates and the ends of the drums will be lubricated by such liquid.

Notwithstanding the fact that a highly efficient seal is provided in the above manner, during normal operation some leakage appears to be unavoidable. To prevent contamination of the discharged cake by the fluent matter which leaks past the cheek plates, and also any fluent matter that may leak between the drum surfaces at the point of substantial tangency, a collecting or drip pan 58, as in Figs. 1 and 2, is provided. The drip pan extends between the drums, along the entire length thereof and may extend almost to, or past, the vertical center line of each drum. The drip pan 56 may be provided with a drain connection 57 to permit fluent matter collected therein to be returned to pipe 47 or a feed tank or sump therefor, and also with a sluicing connection 58 to permit the drip pan to be cleaned out whenever necessary.

Other types of drip pans may be used, such as the modified drip pan design 59 of Fig. 3, which extends nearly to the vertical center line of each drum and is provided with a drain connection 60. In addition, the drip pan 59 may be associated with a pair of combination baffle and scraping plates 61 of modified design which extend to a point beyond the vertical center line of each drum. Or, alternatively, a collecting means, such as the drip pan 62 of Fig. 5, the sides of which extend around and nearly to the horizontal center line of each drum on the side opposite the point of substantial tangency, may be utilized.

The scraping device S may be constructed in any suitable manner, and may be supported on the drip pan or elsewhere. The scraping device may be located adjacent the horizontal center line on the outside of each drum, as in Figs. 3 and 5. The cake removed from the filtering medium by the scraping device falls into a suitable receptacle and may be collected periodically or carried away continuously, as by a belt.

To insure that the surface of the filtering medium will be clean when passing through the sealing zone at the horizontal line of substantial tangency of the drums, a spray of water or the like may be directed thereagainst just prior to the time at which the filtering medium passes through the sealing zone, as from spray pipes 63 of Fig. 1.

A relatively highly effective seal is provided by the introduction of air pressure to each section as it passes through the sealing zone, as described previously, and because of the slight outward extension of filtering medium due to the air pressure, the drums are so disposed that the filtering mediums do not touch each other, in the absence of air pressure, but are merely in relatively close juxtaposition.

Instead of utilizing two filter medium surfaces, preferably mounted on drums as heretofore described, one of the surfaces may be imperforate, as that of a roll R of Fig. 6. Roll R has a smaller diameter that the vacuum drum D, and its axis is above that of drum D. Roll R may be covered with rubber or the like, to produce as little wear as possible of the filtering medium, but the roll is rotated so that the peripheral speed of its surface will be the same as the peripheral speed of the surface of drum D. The rate of rotation of the roll R, therefore, normally will differ from the rate of rotation of drum D, and this may be taken care of by suitable gearing or the like. The driving means for the roll and drum may include a common shaft 65 provided with overdrive worms engaging gears disposed in housings 66 and 67, respectively. The worms and gears are preferably accurately machined to provide substantially the exact desired difference in rate of rotation between the roll and drum.

The body B' of fluent matter, disposed in the space above and between the drum surfaces of the drum and roll, may be replenished by a feeding device similar to that previously described, and the roll itself may act as an overflow device to maintain the level of fluent matter substantially constant. Such overflow may pass around the roll and fall into a collecting pan 68 disposed beneath the roll and drum and extending the length thereof. The collecting pan 68 may be provided with a drain connection 69, from which fluent matter may be returned to a tank, sump, or the like, and again fed to the apparatus.

The roll may be kept clean by a scraper 70, as of the squeegee type, so that a clean surface will always be presented in the sealing zone at the point of substantial tangency or horizontal line of relatively close juxtaposition on the surfaces, which is spaced above the horizontal center line of the drum, rather than substantially on the horizontal center line of each drum, as in the previous modification.

The drum D may be constructed similarly to the drums of the previous modification. Air pressure may be introduced into section 12' thereof, while sections 14' and 16' are subjected to a vacuum. Since the axis of the roll R is higher than the axis of the drum D, it will normally be unnecessary to provide a "dead zone" between the section subjected to air pressure and the sections subjected to vacuum, since the point of pick-up may be sufficiently high on the periphery of the drum D to correspond to the point of pick-up on the drums D and D' of the previous modification. (The above, of course, does not apply to the desirability of rendering a section "dead" for a short space, sufficient to seal the air pressure from the vacuum.)

So that the surface of the filtering medium will be clean when passing through the sealing zone, a spray pipe 63', similar to spray pipe 63 of Fig. 1, may be provided in the position shown. After deposition of the cake, it may be washed and then removed by suitable scraping means, substantially as before.

The apparatus of Figs. 6 and 7 may be provided with cheek plates, as before, for sealing the edges of the roll and drum. Suitable vacuum and pressure connections may be provided, as before, and a vacuum receiver V may be disposed at one end of the drum D. The vacuum receiver V has a drain connection 71 at the bottom for removing filtrate, and a vacuum connection 72 at the top. It will be understood, of course, that the drums D and D' of Figs. 1 to 4 may be provided with vacuum receivers of a similar or any other suitable type.

From the foregoing, it will be apparent that the method and apparatus of this invention provide a highly efficient and effective manner of separating the solids from the liquid of fluent matter, and that the factors which apparently have prevented similar arrangements from being successful in the past have in a large measure been overcome.

It will be apparent to those skilled in the art that various changes may be made without departing from the spirit and scope of this invention, as defined in the appended claims.

What is claimed is:

1. A method of filtering fluent matter, which comprises moving a pair of endless filter medium surfaces along circumferential paths arranged in relatively close juxtaposition along a substantially horizontal line, said surfaces being moved so that each travels upwardly and away from said horizontal line; feeding a body of slurry onto the filter surfaces in a confined zone above said surfaces and extending downwardly to said surfaces and said horizontal line; producing an absolute pressure, against at least one said surface on the side opposite said body of slurry and at least adjacent said horizontal line, sufficiently great to press said surface against the other surface at least adjacent said horizontal line; producing a sufficiently low absolute pressure against said filter surfaces on the side opposite said body of slurry during movement of said surfaces through said confined zone to cause deposition of suspended matter upon said surfaces and to cause filtrate to be drawn through the filter medium above said horizontal line; and removing said deposited matter from the medium surfaces beyond the confined zone.

2. A method of filtering fluent matter which comprises moving a pair of endless filter surfaces along circumferential paths arranged in relatively close juxtaposition along a substantially horizontal line, said surfaces being moved so that each travels upwardly and away from said horizontal line; feeding a body of slurry onto the filter surfaces in a confined zone above said surfaces and extending downwardly to said surfaces and said horizontal line; producing an absolute pressure against said surfaces on the side opposite said body of slurry and at and adjacent said horizontal line, said pressure being sufficient to press one surface against the other surface at said horizontal line and being applied alternately to predetermined sections of said surfaces, such sections being disposed in opposed alternate relation as said surfaces move past said horizontal line; producing a sufficiently low absolute pressure against said filter surfaces on the side opposite said body of slurry and during movement thereof through said confined zone to cause deposition of suspended matter on said surfaces and withdrawal of filtrate through said mediums above said horizontal line; and removing said deposited matter from said medium surfaces beyond said confined zone.

3. In apparatus for filtering fluent matter, a pair of parallel rotatable drums having radial partitions dividing said drums into axially extending and peripheral sections; a filter medium attached to the periphery of each drum; means for positioning said drums horizontally and in relatively close juxtaposition along a horizontal tangential line with the peripheral sections of one drum disposed alternately with respect to the peripheral sections of the other drum; means for introducing fluent matter substantially uniformly throughout the space between said surfaces above said line; means for rotating said drums in opposite directions and upwardly at said horizontal line; means connecting with said sections for producing a sufficiently low absolute pressure against said filtering medium within said drums to cause deposition of solids from said body of fluent matter and to cause withdrawal of filtrate through said sections; and means for producing within said drums a higher absolute pressure than produced by said body of fluent matter against successive filter medium sections as said sections pass said horizontal line.

4. Apparatus for filtering fluent matter, comprising a pair of drums; a filter medium attached to the periphery of each drum; means for positioning said drums in horizontal parallel relationship and in relatively close juxtaposition along a horizontal tangential line; means for introducing fluent matter into the space formed above and between said drums; means for rotating said drums so that each moves upwardly away from said tangential line; means for producing a sufficiently low absolute pressure at predetermined points within the periphery of each drum so as to draw filtrate from said fluent matter through said filter medium and cause solids to be deposited upon the surface of said filter medium; and means for securing said filtering medium to said drums, including a plurality of spaced, circumferentially extending bands, the bands on one drum being staggered with respect to the bands on the other drum to permit rotation of the band surfaces of one drum across said tangential line in spaced and non-contacting relation to the corresponding band surfaces of the other drum where said drums are in relatively close juxtaposition.

C. LYNN PETERSON.

REFERENCES CITED

The following references are of record in the file of this patent:

UNITED STATES PATENTS

| Number | Name | Date |
|---|---|---|
| 82,735 | Merrill | Oct. 6, 1868 |
| 463,757 | Jewell | Nov. 24, 1891 |

(Other references on following page)

UNITED STATES PATENTS

| Number | Name | Date |
|---|---|---|
| 620,786 | Koerper et al. | Mar. 7, 1899 |
| 958,063 | Arbuckle | May 17, 1910 |
| 1,449,774 | Najarian | Mar. 27, 1923 |
| 1,712,258 | Compain | May 7, 1929 |
| 1,917,818 | Woodworth | July 11, 1933 |
| 2,061,257 | Sablik | Nov. 17, 1936 |
| 2,263,888 | Richter | Nov. 25, 1941 |
| 2,306,074 | Meyer | Dec. 22, 1942 |
| 2,403,021 | Peterson et al. | July 2, 1946 |

FOREIGN PATENTS

| Number | Country | Date |
|---|---|---|
| 273,072 | Germany | Apr. 17, 1914 |
| 46,005 | Sweden | Oct. 27, 1919 |
| 450,664 | Germany | Oct. 13, 1927 |
| 533,246 | Germany | Sept. 14, 1931 |
| 532,968 | Germany | Sept. 16, 1931 |
| 443,475 | Great Britain | Feb. 28, 1936 |